(12) United States Patent
Talcott et al.

(10) Patent No.: US 7,096,390 B2
(45) Date of Patent: Aug. 22, 2006

(54) SAMPLING MECHANISM INCLUDING INSTRUCTION FILTERING

(75) Inventors: Adam Talcott, San Jose, CA (US); Mario Wolczko, San Carlos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 585 days.

(21) Appl. No.: 10/113,357

(22) Filed: Apr. 1, 2002

(65) Prior Publication Data

US 2003/0188226 A1    Oct. 2, 2003

(51) Int. Cl.
*G06F 11/00* (2006.01)

(52) U.S. Cl. ............... 714/45; 714/47; 712/227; 717/127

(58) Field of Classification Search ............... 714/45, 714/47; 712/227; 717/127–131
See application file for complete search history.

(56) References Cited

U.S. PATENT DOCUMENTS

| 5,809,450 | A | * | 9/1998 | Chrysos et al. | ............. | 702/186 |
| 6,000,044 | A |   | 12/1999 | Chrysos et al. | ............... | 714/47 |
| 6,026,236 | A | * | 2/2000 | Fortin et al. | ................. | 717/127 |
| 6,092,180 | A | * | 7/2000 | Anderson et al. | ........... | 712/200 |
| 6,195,748 | B1 | * | 2/2001 | Chrysos et al. | ............. | 712/227 |
| 6,539,502 | B1 | * | 3/2003 | Davidson et al. | ............. | 714/47 |
| 6,574,727 | B1 | * | 6/2003 | Davidson et al. | ........... | 712/227 |

OTHER PUBLICATIONS

Dean, Jeffrey; Hicks, James E.; Waldspurger, Carl A.; Wiehl, William E.; Chrysos, George; *ProfileMe: Hardware Support for Instruction-Level Profiling on Out-of-Order Processors*, 1997 IEEE Published in the Proceedings of Micro-30, Dec. 1-3, 1997, Research Triangle Park, North Carolina.

Dean, Jeffrey; Hicks, James E.; Waldspurger, Carl A.; Weihl, William E.; *Transparent, Low-Overhead Profiling on Modern Processors*, http://www.research.digital.com/SRC/dcpi/.

*IA-32 Intel Architecture Software Developer's Manual, vol. 3: System Programming Guide*, 1997 Intel Corporation.

* cited by examiner

*Primary Examiner*—Robert Beausoliel
*Assistant Examiner*—Emerson Puente
(74) *Attorney, Agent, or Firm*—Hamilton & Terrile; Stephen A. Terrile

(57) ABSTRACT

A sampling mechanism is disclosed in which software can specify a property or properties which characterize samples of interest. For example, if the software is interested in cache behavior, the software can specify that information for memory operations, or only information for memory instructions which miss in one or more caches, be reported. The sampling mechanism may specify many such properties and events (properties and events may vary from processor to processor, and may also depend on which properties or events are considered useful for performance analysis).

5 Claims, 5 Drawing Sheets

SAMPLING MECHANISM INCLUDING INSTRUCTION FILTERING

BACKGROUND OF THE INVENTION

1. Field of the Invention

The present invention relates to processors, and more particularly to sampling mechanisms of processors.

2. Description of the Related Art

One method of understanding the behavior of a program executing on a processor is for a processor to randomly sample instructions as the instructions flow through the instruction pipeline. For each sample, the processor gathers information about the execution history and provides this information to a software performance monitoring tool. Unlike tools which aggregate information over many instructions (i.g., performance counters), such an instruction sampling mechanism allows the performance analyst to map processor behaviors back to a specific instruction.

A drawback of this approach is that each sample reported to software incurs an overhead (typically due to the trap raised to inform software that the sample is ready). This overhead also has an effect on the behavior of the processor being observed and may cause a disruption of the processor performance. If this disruption dramatically changes the behavior of the processor, the disruption can contaminate any conclusions based on the instruction sample.

The contamination is particularly detrimental when the sample is not of interest to the performance monitoring software. For example, if the software wishes to analyze cache behavior of a program and a sample is reported for an add instruction (which does not use the caches) then the overhead and disruption of sampling is incurred without providing the software with any useful information.

SUMMARY OF THE INVENTION

The present invention allows software using a sampling mechanism to specify which samples are of interest and to allow the sampling mechanism to discard or ignore uninteresting samples. Such a method accomplishes sampling without incurring execution overhead or altering the behavior of a program under study.

In a sampling mechanism according to the present invention, software can specify a property or properties which characterize samples of interest. For example, if the software is interested in cache behavior, the software can specify that only memory operations, or only memory instructions which miss in one or more caches, be reported. The sampling mechanism may specify many such properties and events (properties and events may vary from processor to processor, and may also depend on which properties or events are considered useful for performance analysis). This invention is applicable to any list of these properties or events.

In one embodiment, the invention relates to a method of sampling instructions executed in a processor. The method includes: selecting an instruction for sampling; storing information relating to the instruction; determining whether the instruction includes events of interest; and reporting the instruction if the instruction includes events of interest.

In another embodiment, the invention relates to a method of sampling instructions executed in a processor. The method includes: setting a candidate counter to a number; selecting an instruction for sampling; storing information relating to the instruction; determining whether all events for the instruction have occurred; decrementing the candidate counter when all events for the instruction have occurred; determining whether the candidate counter equals zero; and reporting the instruction when the candidate counter equals zero.

In another embodiment, the invention relates to a method of sampling instructions executed in a processor. The method includes: setting a candidate counter to a number; selecting an instruction for sampling; storing information relating to the instruction; determining whether all events for the instruction have occurred; determining whether the instruction includes events of interest; decrementing the candidate counter when all events for the instruction have occurred and when the instruction includes events of interest; determining whether the candidate counter equals zero; and reporting the instruction when the candidate counter equals zero.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
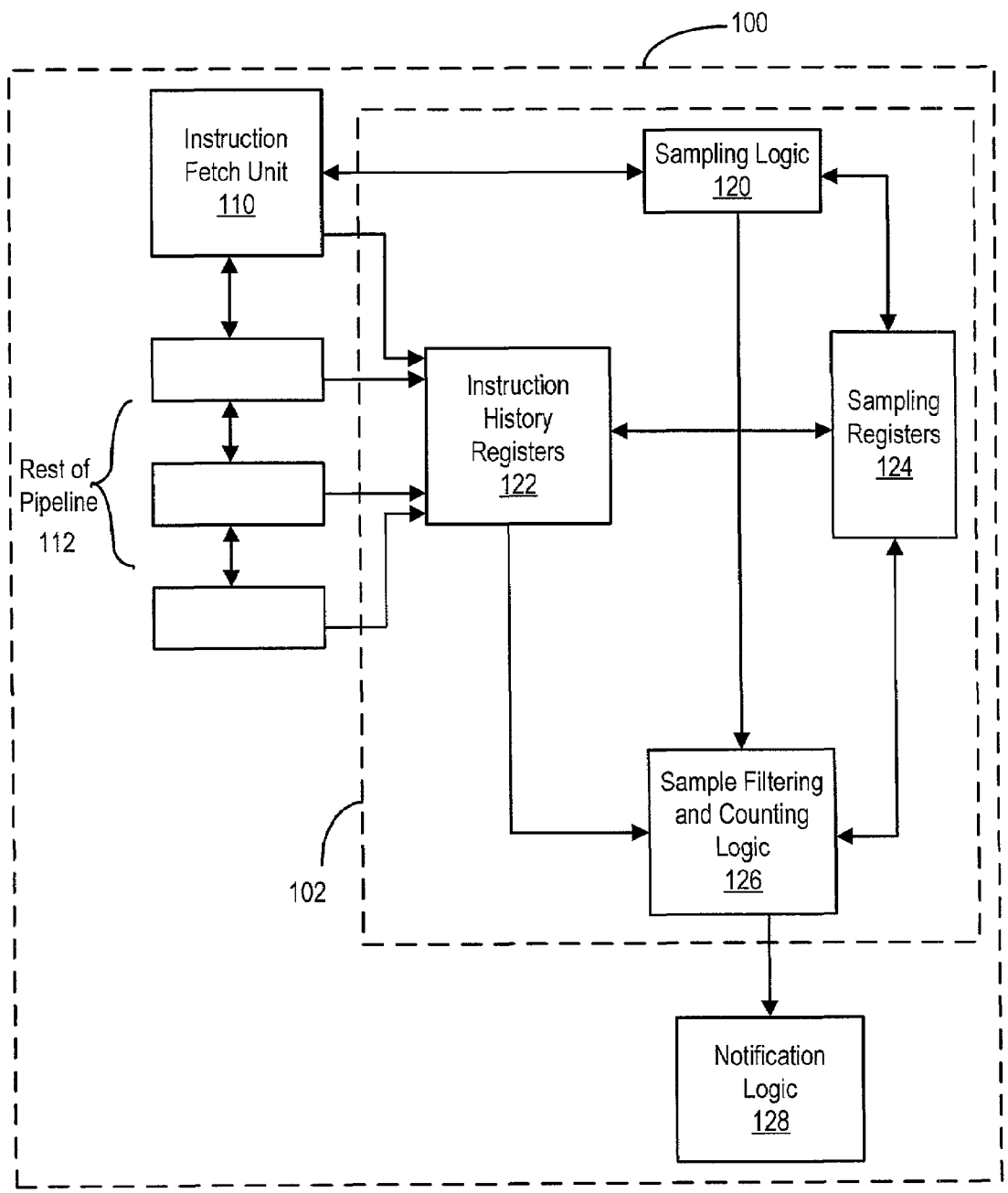
FIG. 1 shows a block diagram of a processor having a sampling mechanism in accordance with the present invention.

Referring to FIG. 1, processor 100 includes sampling mechanism 102. This sampling mechanism 102 is provided to collect detailed information about individual instruction executions. The sampling mechanism 102 is coupled to the instruction fetch unit 110 of the processor 100. The fetch unit 110 is also coupled to the remainder of the processor pipeline 112. Processor 100 includes additional processor elements as is well known in the art.

The sampling mechanism 102 includes sampling logic 120, instruction history registers 122, sampling registers 124, sample filtering and counting logic 126 and notification logic 128. The sampling logic 120 is coupled to the instruction fetch unit 110, the sampling registers 124 and the sample filtering and counting logic 126. The instruction history registers 122 receive inputs from the instruction fetch unit 110 as well as the remainder of the processor pipeline 112; the instruction history registers 122 are coupled to the sampling registers 124 and the sample filtering and counting logic 126. The sampling registers 124 are also coupled to the sample filtering and counting logic 126. The sample filtering and counting logic 126 are coupled to the notification logic 128.

The sampling mechanism 102 collects detailed information about individual instruction executions. If a sampled instruction meets certain criteria, the instruction becomes a reporting candidate. When the sampling mode is enabled, instructions are selected randomly by the processor 100 (via, e.g., a linear feedback shift register) as they are fetched. An instruction history is created for the selected instruction. The instruction history is made up of a vector of information including such things as events induced by the sample instruction and various associated latencies. When all events for the sample instruction have been generated (e.g., after the instruction retires or aborts), the vector of events gathered by the instruction history is compared with a user supplied vector, which indicates the events of interest.

In one embodiment, software indicates the properties or events of interest via a bit vector contained in a hardware-readable register. Each bit in this vector corresponds to a property or event which the hardware can gather for an instruction sample. The register can be used as a filter which hardware can apply to an instruction sample to determine if that sample is a candidate for reporting to software. Once these properties or events have been specified, the hardware mechanism that gathers samples compares each sample against the vector of desired properties or events. Hardware can determine a match by combining the software-specified filter with an instruction sample. This combination could be a simple mask operation, or a more expressive operation. Based upon the comparison, the hardware may reject the sample without incurring any software overhead. If the sample matches one or more software-specified properties or events, the sample can be reported to software.

The instruction history, along with other factors including program counter (PC), and privilege status are examples of criteria used in selecting whether an instruction may become a candidate for sampling. If an instruction meets the eligibility test and becomes a candidate, a candidate counter is decremented. If the counter becomes zero, the instruction sample is reported via the notification logic 128. Software copies the instruction's history from the instruction history registers 122 and resets the candidate counter.

Figure 2A:
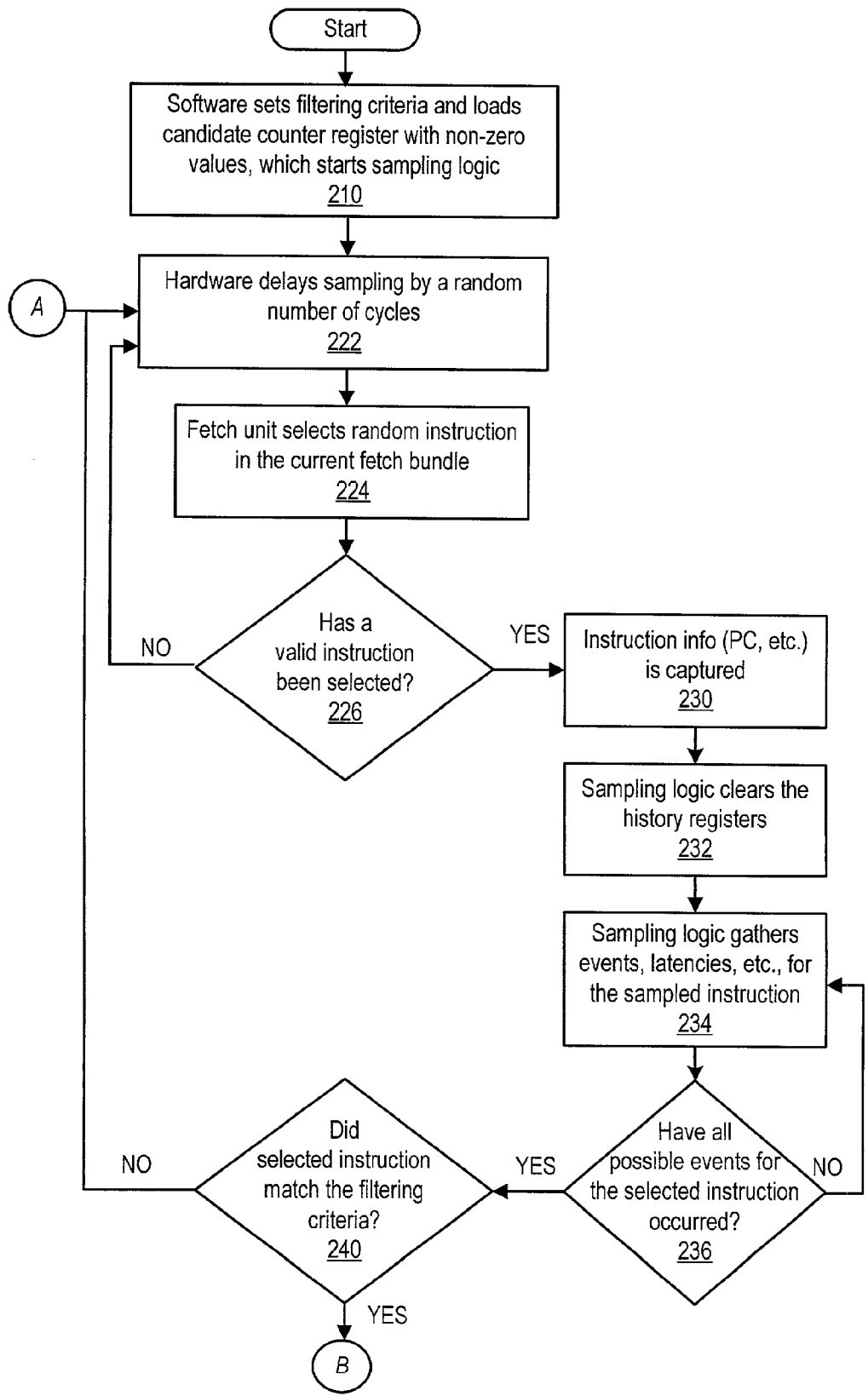
FIGS. 2A and 2B show a flow chart of the operation of the sampling mechanism in accordance with the present invention.
Figure 2B:
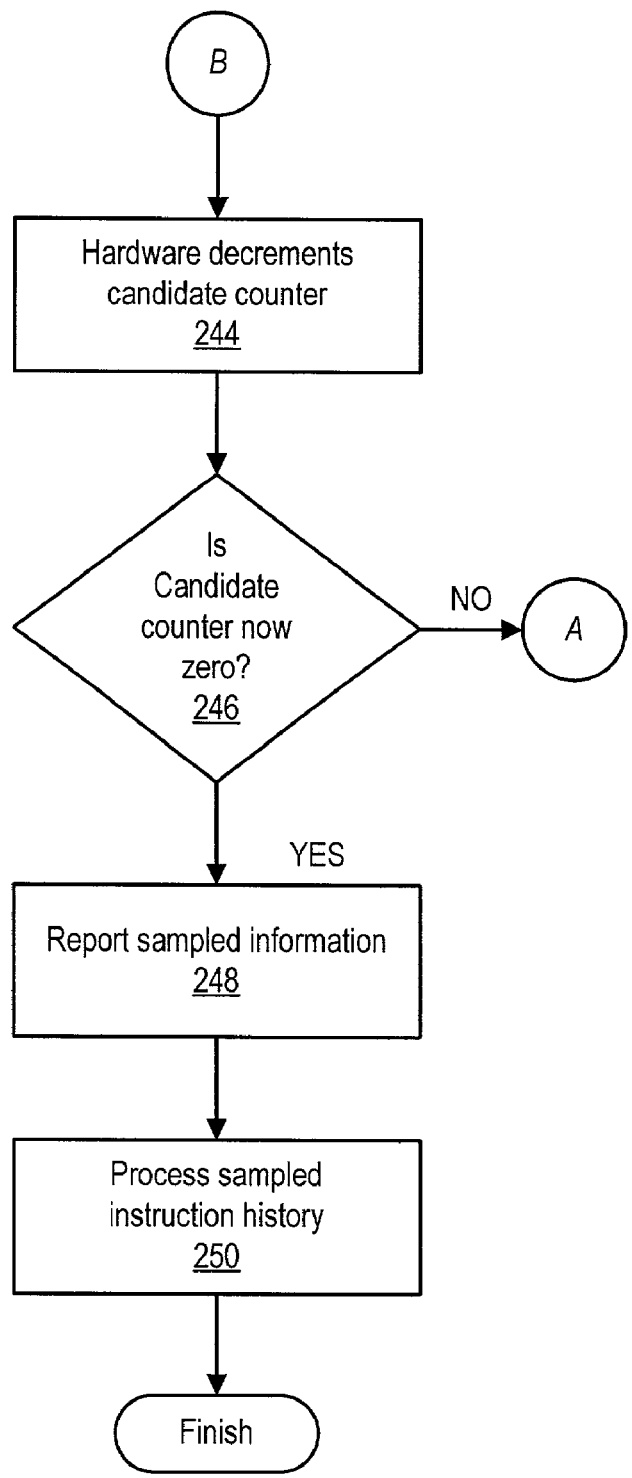

FIGS. 2A and 2B show a flowchart of the operation of sampling mechanism 102. More specifically, at step 210, the software sets filtering criteria and loads a candidate counter register, located within the sample filtering and counting logic 126, with a non-zero value, thus enabling the sampling logic 120. Once the counter register is loaded, the sample filtering and counting logic 126 delays sampling by a random number of cycles at step 222. Next the fetch unit 110 selects a random instruction from a current fetch bundle at step 224. The instruction is analyzed to determine whether a valid instruction has been selected at step 226. If not, then the sampling mechanism 102 returns to step 222.

If the fetched instruction is a valid instruction, then instruction information is captured at step 230. The instruction information includes, for example, the program counter (PC) of the instruction as well as privileged information and context information of the instruction. Next, the sample logic 120 clears the instruction history registers 122 at step 232. Next, during execution of the instruction by the processor 100, the sampling logic 120 gathers events, latencies, etc. for the sampled instruction at step 234. The sample logic 120 then reviews the processor state to determine whether all possible events for the selected instruction have occurred at step 236. If not, then the sampling logic 120 continues to gather events etc. at step 234.

If all possible events for the selected instruction have occurred, then the instruction is examined at step 240 to determine whether the selected instruction matches the filtering criteria (i.e., is the selected instruction of interest to the software?). If not, then control returns to step 222 where the counting logic 126 delays the sampling by a random number of cycles to select another instruction for sampling.

If yes, then the counting logic 126 decrements a candidate counter at step 244. Next the candidate counter is analyzed to determine whether the candidate counter is zero at step 246. If the candidate counter is not zero, then control returns to step 222 where the counting logic 126 delays the sampling by a random number of cycles prior to selecting another instruction. If the candidate counter equals zero, then the notification logic 128 reports the sampled instruction at step 248. The candidate counter register value is used to count candidate samples which match the selection criteria. On the transition from 1 to 0 (when made by hardware following a sample) a notification is provided and the instruction history is made available via the SIH registers. The counter then stays at zero until changed by software. The power-on value of the candidate counter register value is 0. The candidate counter allows software to control how often samples are reported, and thus limits the reporting overhead for instructions which are both interesting and frequent. The software then processes the sampled instruction history at step 250 and the processing of the sampling mechanism 102 finishes.

Figure 3:
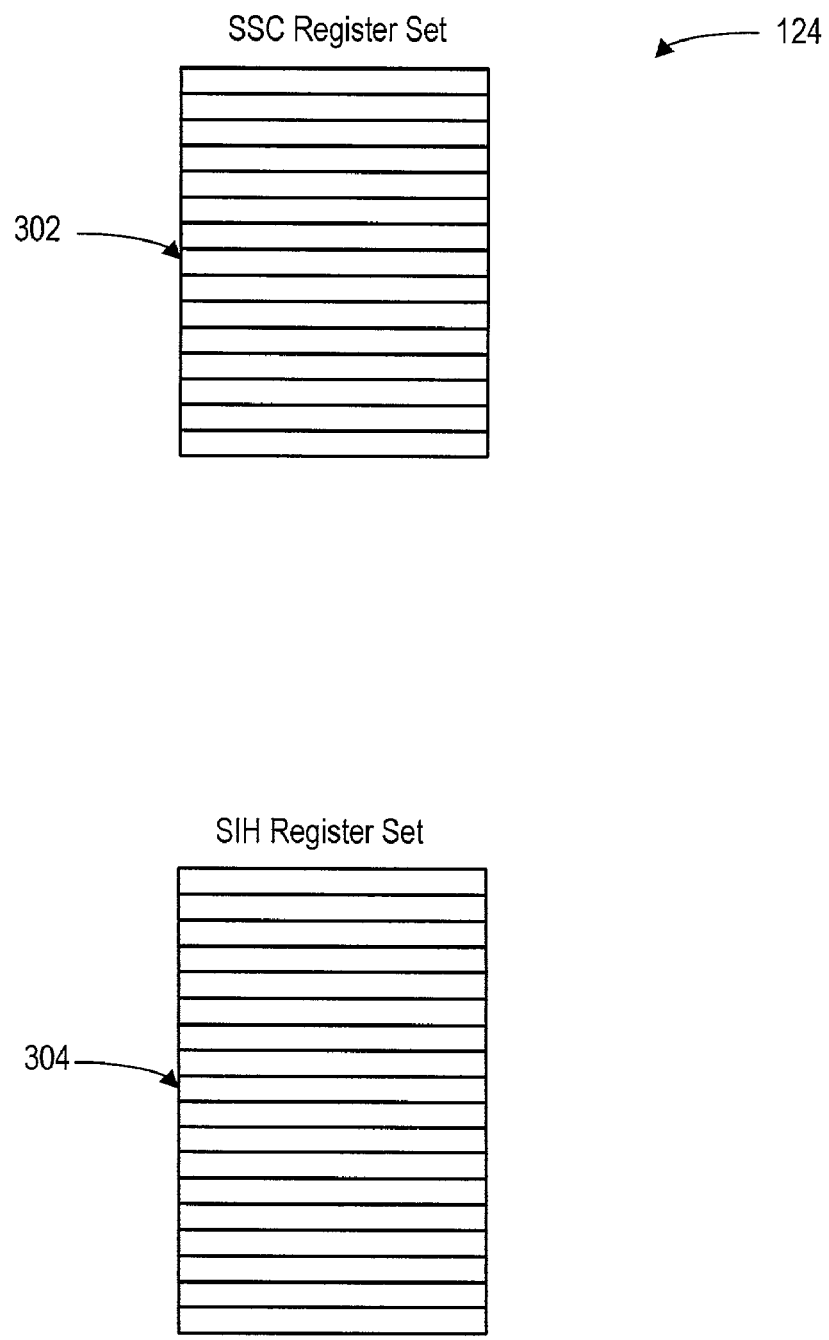
FIG. 3 shows a block diagram of the sampling registers of the sampling mechanism.

Referring to FIG. 3, the sampling registers 124 include a set of sample selection criteria registers (SSC) 302 and the instruction history registers 122 include a set of sampled instruction history registers (SIH) 304.

The set of SSC registers 302 include a plurality of registers. More specifically, the set of SSC registers 302 include an interesting event register, a PC range register, a latency mask register, and a privileged, nonprivileged register.

With the interesting event register values, when a sampled instruction completes execution, the vector of events that were caused by that instruction is compared with the interesting event value. Based upon the comparison, the hardware may reject the sample without incurring any software overhead. The PC range register values set forth, e.g., via a PC low value and a PC high value, instructions which are eligible for sampling. The latency mask register value provides a mask which is compared with the latency (i.e., a LAT field) of the instruction history; the result is non-zero for the instruction to be eligible for sampling. The latency mask register value is used to filter out instructions whose execution latency is below a desired threshold. With the privileged, nonprivileged register value, if the sampled instruction is executing in privileged mode, the privileged value is set to 1 for the sample to be eligible. Similarly if the sampled instruction is executing in nonprivileged mode, the privileged value is set to 0.

The set of SIH registers 304 include a plurality of registers. More specifically, the set of SIH registers 304 include an events register value, a PC register, a branch target address register, an effective memory address register, a latency register, a number in issue bundle register, a number in retire bundle register, a privileged register, a branch history register, and a number in fetch bundle register.

The events register contains the vector of events that were caused by the sampled instruction. The program counter register value is the PC of the sampled instruction. The branch target address register value is, for branches, the target address of the branch. The effective memory address register value is for memory instructions (loads, stores, etc.), where the effective memory address of the lowest-address word accessed by a memory operation. The latency register value is the number of cycles needed for the instruction to retire, as measured from the time the instruction was fetched, or some other fixed event early in the instruction's lifetime. The number in issue bundle register value represents how many instructions were issued in the same cycle as the sampled instruction. The number in retire bundle register value represents how many instructions were retired in the same cycle as the sampled instruction.

Other Embodiments

Other embodiments are within the following claims.

For example, the sampling mechanism 102 may function in a multithreaded processor. In one possible implementation of a sampling mechanism 102 in a multithreaded process, the sampling mechanism 102 is enabled independently for each thread of the processor 100. Each thread of the processor has its own candidate counter and selection criteria registers. However, there is a single set of history registers shared across threads. The sampling logic 120 samples a single instruction at a time, alternating between threads. When a sampled instruction becomes a reporting candidate, the per-thread candidate counter is decremented; if the per-thread candidate counter becomes zero, the sample is reported to the thread from which it was sampled. Sampling is restarted only after the contents of the history registers has been copied and sampling is enabled. Accordingly, it is desirable to accomplish this task with minimal delay; until the copying has been completed, neither thread can have instructions sampled (because the history registers could be overwritten prematurely).

Figure 4:
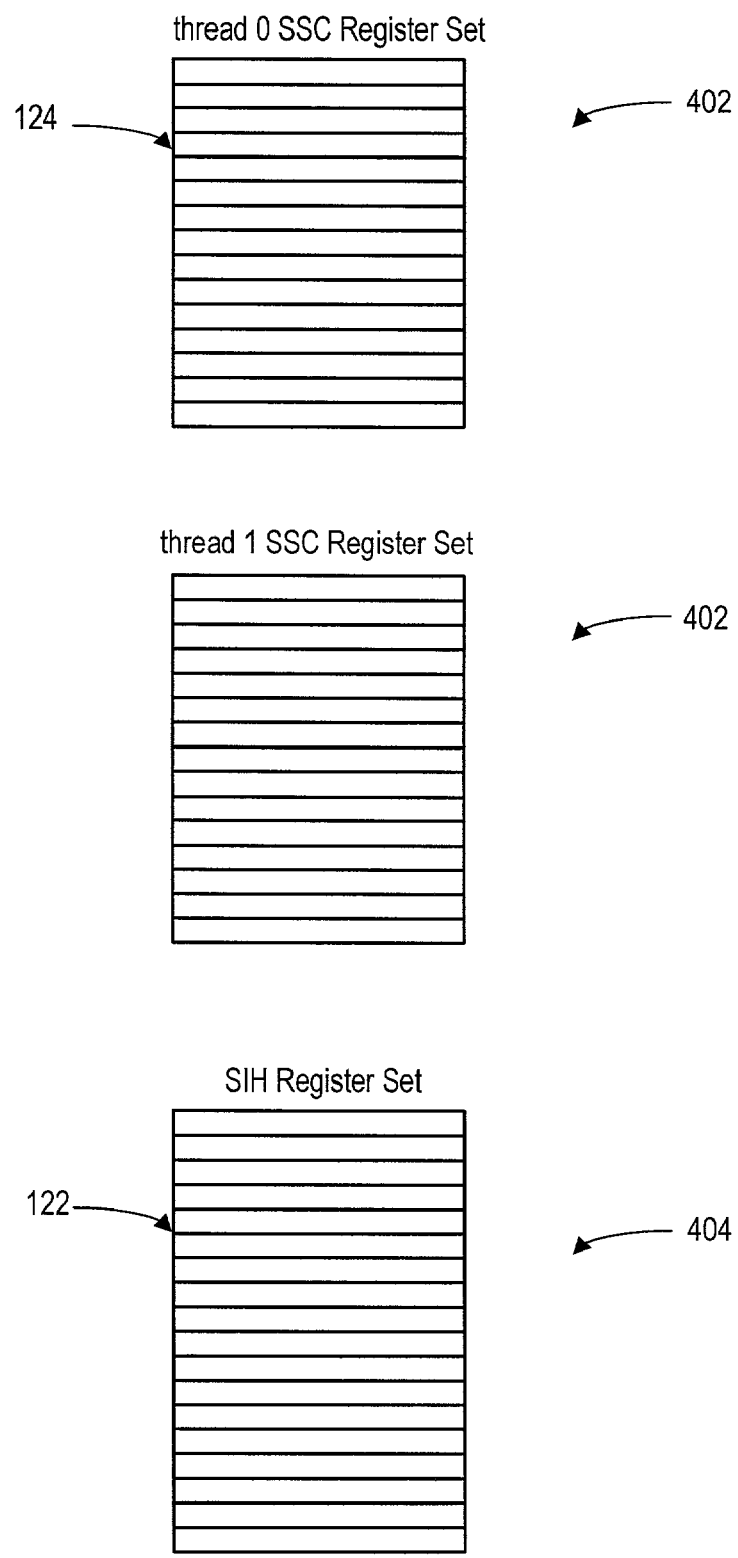
FIG. 4 shows a block diagram of sampling registers of another embodiment of the sampling mechanism.

More specifically, referring to FIG. 4, in another example, each thread within the processor 100 has its own set of SSC registers 402 and the sample selection criteria register file, but there is a single set of shared SIH registers 122 and sampled instruction history register 404 file.

Alternately, in a multithreaded processor environment, each thread may have a respective independent sampling mechanism.

Also for example, while the sampling mechanism 102 is shown coupled to the instruction fetch unit 110, it will be appreciated that the sampling mechanism 102 may be coupled to any location in the processor in which instruction information could be sampled.

Also for example, while certain sample selection criteria values and sample instruction history values have been set forth, it will be appreciated that any combination of these values as well as other values are within the scope of the invention.

What is claimed is:

1. A method of sampling instructions executing in a processor comprising:

setting a candidate counter to a number selecting an instruction for sampling;

storing information relating to the instruction after the instruction is selected for sampling, the information relating to the instruction including information relating to execution of the instruction;

determining whether all events for the instruction have occurred;

determining whether the instruction includes events of interest, the events of interest being based upon the information relating to execution of the instruction;

decrementing the candidate counter when all events for the instruction have occurred and when the instruction includes events of interest;

determining whether the candidate counter equals zero;

reporting the instruction when the candidate counter equals zero; and, repeating the setting, selecting, storing, determining whether all events for the instruction have occurred, determining whether the instruction includes events of interest, decrementing and reporting, such that while information is stored relating to a plurality of instructions, then information relating to an instruction is only reported for instructions containing events of interest.

2. The method of claim 1 further comprising providing a register with a bit vector representing events of interest; and wherein the determining whether the instruction includes events of interest further includes comparing the information relating to the instruction to the bit vector.

3. The method of claim 1 wherein the comparing is via at least one of a mask operation or a more expressive operation.

4. The method of claim 1 wherein the information relating to the instruction represents an instruction history, and the instruction history includes information relating to at least one of an events value, a program counter value, a branch target address value, an effective memory address value, a latency value, a number in issue bundle value, a number in retire bundle value, a privileged value, a branch history value and a number in fetch bundle value.

5. The method of claim 1 wherein the selecting an instruction for sampling is based upon sample selection criteria; and the sample selection criteria include information relating to at least one of an interesting event value, a program counter range value, a latency mask value, and a privileged, non-privileged value.

* * * * *